United States Patent [19]
Dodakian

[11] Patent Number: 5,816,598
[45] Date of Patent: Oct. 6, 1998

[54] TWO-WHEEL DRIVE HAND AND FOOT POWERED BICYCLE

[76] Inventor: Wayne S. Dodakian, 77 Oakland Ave., New Britain, Conn. 06053

[21] Appl. No.: 616,258

[22] Filed: Mar. 15, 1996

[51] Int. Cl.⁶ ............................................. B62M 9/06
[52] U.S. Cl. .......................... 280/234; 280/233; 280/250
[58] Field of Search .................................. 280/233, 234, 280/242.1, 247, 248, 249, 250, 279, 261

[56] References Cited

U.S. PATENT DOCUMENTS

| | | | |
|---|---|---|---|
| 4,109,927 | 8/1978 | Harper | 280/242.1 |
| 4,147,370 | 4/1979 | Lindsey | 280/234 |
| 4,152,005 | 5/1979 | Vanore | 280/234 |
| 4,471,972 | 9/1984 | Young | 280/304.1 |
| 4,548,420 | 10/1985 | Patroni | 280/233 |
| 4,773,662 | 9/1988 | Phillips | 280/233 |
| 5,041,043 | 8/1991 | Hoke | 280/278 |

*Primary Examiner*—Paul N. Dickson
*Attorney, Agent, or Firm*—Alix, Yale & Ristas, LLP

[57] ABSTRACT

A two-wheel drive hand and foot powered bicycle in accordance with the present invention includes a rear wheel that is driven by a foot pedal via a chain and derailleur mechanism. A front wheel is rotatably mounted to the bottom portions of first and second yokes. The first yoke is pivotally mounted to the front portion of the bicycle frame and the upper portion of the second yoke is rigidly mounted to the first yoke by a steering coupling member, wherein a steering torque applied to second yoke pivots the first yoke to turn the front wheel. A hand crank assembly is rotatably mounted to the steering coupling member and the upper portion of the second yoke. Power generated by operation of the hand crank assembly is transmitted by a chain to a sprocket assembly mounted to the front wheel. The operator may selectively power the front wheel, the rear wheel, or both wheels simultaneously. The lengths of the second yoke and the steering coupling member may be adjusted to properly position the hand crank assembly for a specific driver by telescopically moving an inner segment into or out of a tubular outer segment. The selected length is fixed by inserting a bolt through complementary apertures in the inner and outer segments and attaching a lock-nut.

19 Claims, 5 Drawing Sheets

TWO-WHEEL DRIVE HAND AND FOOT POWERED BICYCLE

BACKGROUND OF THE INVENTION

This invention relates generally to cycle vehicles. More particularly, the present invention relates to hand and foot powered bicycles.

Foot powered cycle vehicles are well known in the art. The drive mechanisms for such vehicles generally apply the power generated by the driver's legs and feet to the rear wheel. For example U.S. Pat. No. 4,019,230 discloses a roller clutch and ratchet arrangement to apply rotary leg motion to the rear wheel of a bicycle. U.S. Pat. No. 5,002,296 discloses a chainless driving device for coupling foot operated pedals to the rear wheel of a bicycle. U.S. Pat. No. 5,351,575 discloses a pumping propulsion system for driving the rear wheel of a bicycle.

Various cycle vehicles have also been devised which are powered by the driver's arms and hands. Such cycle vehicles may be designed for persons who do not have the full use of their legs, such as paraplegics. It is generally assumed that utilizing the arms and hands to simultaneously provide power to the cycle and to steer a cycle is beyond the ability of human control. Therefore, the power function and the steering function have been separated where the physical capabilities of the driver allows. For example, U.S. Pat. No. 5,354,084 discloses a three-wheeled vehicle which is driven by arm and hand power which is applied to the front wheel and which is steered by body-lean which is applied to the rear wheels. U.S. Pat. No. 4,695,071 discloses a hand operated tricycle wherein the drive mechanism applies the power generated by the driver's arms and hands to the front wheel. Although the yoke mounting the front wheel is pivotally mounted to the frame to allow the driver to steer the cycle, the cycle utilizes two back wheels to provide the stability required for operation in this manner.

A variety of cycle vehicles have also been devised which are powered by the driver's arms, hands, legs and feet. The power generated by the driver's limbs is applied to the rear wheel and the front wheel is used exclusively for steering. For Example, U.S. Pat. Nos. 4,726,600, 5,002,298, 5,209,506, and 5,372,374 all disclose cycle vehicles wherein the driver's arms, hands, legs and feet provide the power to drive the rear wheel. U.S. Pat. No. 5,354,083 discloses a cycle vehicle which utilizes foot power, a seat drive, a seat backrest drive, and a shoulder drive to power the rear wheel of the cycle. Such cycle vehicles are generally cumbersome and require major modifications to readily available cycle vehicle parts.

SUMMARY OF THE INVENTION

Briefly stated, the invention in a preferred form is a two-wheel drive hand and foot powered bicycle which comprises a first yoke having an upper shaft portion which is pivotally mounted to the front portion of the bicycle frame. A front wheel is rotatably mounted to the bottom portion of the first yoke. A rear wheel is rotatably mounted to a rear portion of the frame in a conventional manner. A seat is mounted to an upper portion of the frame such that the height of the seat may be adjusted relative to the frame. A foot pedal assembly is rotatably attached to a lower portion of the frame. Power generated by operation of the foot pedal assembly is transmitted by a chain to a first sprocket assembly mounted on the rear wheel.

A second yoke is mounted to the first yoke at its upper portion by a steering coupling member and at its lower portion by the hub of the front wheel. The second yoke and the steering coupling member are each comprised of a tubular first segment and a second segment which is slidably received in the first segment. The first segment has a pair of oppositely disposed apertures. The second segment has a plurality of longitudinally spaced apertures. The second segment is mounted to the first segment by aligning one of the apertures in the second segment with the pair of apertures in the first segment and inserting a bolt through the aligned apertures. A lock-nut is threaded onto the threaded portion of the bolt to secure the second segment to the first segment.

The second segment of the steering coupling member and the second segment of the second yoke each comprise an orifice for receiving the bearing and axle of a hand crank assembly. Power generated by operation of the hand crank assembly is transmitted by a chain to a sprocket assembly mounted to the front wheel. The sprocket assembly may be any conventional sprocket assembly which is shifted by a conventional derailleur and lever assembly. The hand crank assembly acts as a steering wheel wherein applying greater torque against one of the handles causes the first yoke to pivot.

The location of the hand crank assembly relative to the seat can be modified by adjusting the length of steering coupling member, adjusting the length of the second yoke, and adjusting the height of the seat. The length of the second yoke and the steering coupling member is adjusted by removing the bolt, sliding the second segment into or out of the first segment, aligning another of the apertures in the second segment with the pair of apertures in the first segment, reinserting the bolt, and engaging the nut on the bolt. The steering coupling member has an arcuate shape which allows the relative vertical positions of the hand cranks and the seat to remain substantially constant as the length of the steering coupling member is adjusted.

Simultaneous operation of the foot pedal assembly and the hand crank assembly to apply power to both the front and rear wheels allows the driver to accelerate faster and to maintain a higher speed than that which can be attained by conventional cycles. In addition, application of power to the front wheel allows the driver to pull the cycle through turns, providing greater control and safety. Use of a second yoke to offset the hand crank assembly from the axis of the first yoke prevents operation of the hand crank assembly from causing the cycle to become unstable.

An object of the invention is to provide a new and improved bicycle having a front wheel which is selectively powered by hand and a rear wheel which is selectively powered by foot, each independent from the other.

Another object of the invention is to provide a new and improved bicycle having a front wheel which is selectively powered by hand and a rear wheel which is selectively powered by foot wherein the position of the hand crank assembly is easily adjustable.

A further object of the invention is to provide a new and improved bicycle having a front wheel which is selectively powered by hand and a rear wheel which is selectively powered by foot which can be manufactured from standard components with little modification.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawing in which.

DETAILED DESCRIPTION OF THE PREFERRED EMBODIMENT

Figure 1:
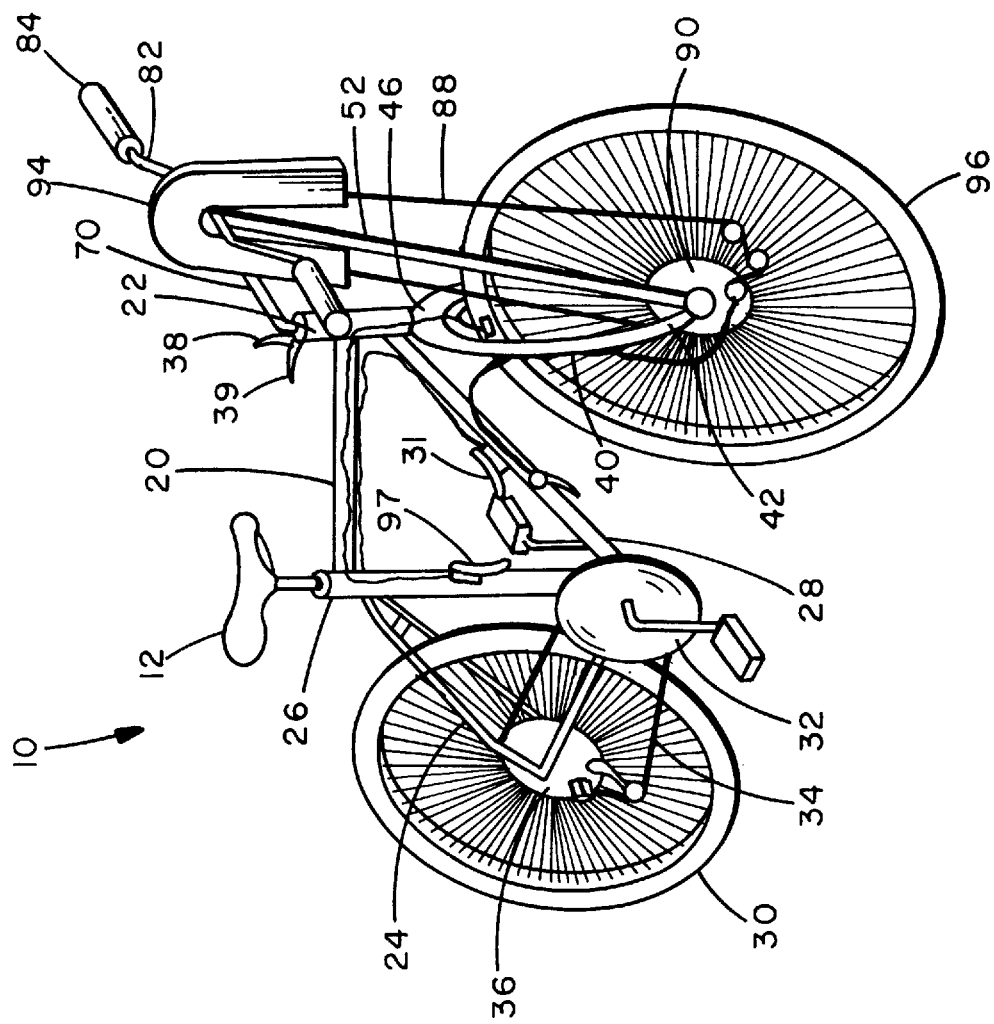
FIG. 1 is a perspective view of a bicycle in accordance with the invention.

With reference to the drawings wherein like numerals represent like parts throughout the several figures, a two-wheel drive hand and foot powered bicycle in accordance with the present invention is generally designated by the numeral 10. The bicycle 10 comprises a first yoke 40 which is pivotally mounted to the front portion 22 of the bicycle frame 20, as shown in FIG. 1. A rear wheel 30 is rotatably mounted to a rear portion 24 of the frame 20 in a conventional manner. A seat 12 is mounted to an upper portion 26 of the frame 20 such that the height of the seat 12 may be adjusted relative to the frame 20. A foot pedal assembly 32 is rotatably attached to a lower portion 28 of the frame 20. Power generated by operation of the foot pedal assembly 32 is transmitted by a chain 34 to a first sprocket assembly 36 mounted on the rear wheel 30. The chain 34 may be shifted on the foot pedal assembly 32 and the first sprocket assembly 36 by conventional derailleur mechanisms controlled by hand levers 38, 39, respectively. Front and rear wheel brake control levers 97, 31 are mounted on the frame just above the foot pedal assembly 32 for operating front and rear brake systems 14. The brake control levers 31, 97 are mounted such that they may be operated independently or at the same time by either the right or left foot.

Figure 2:
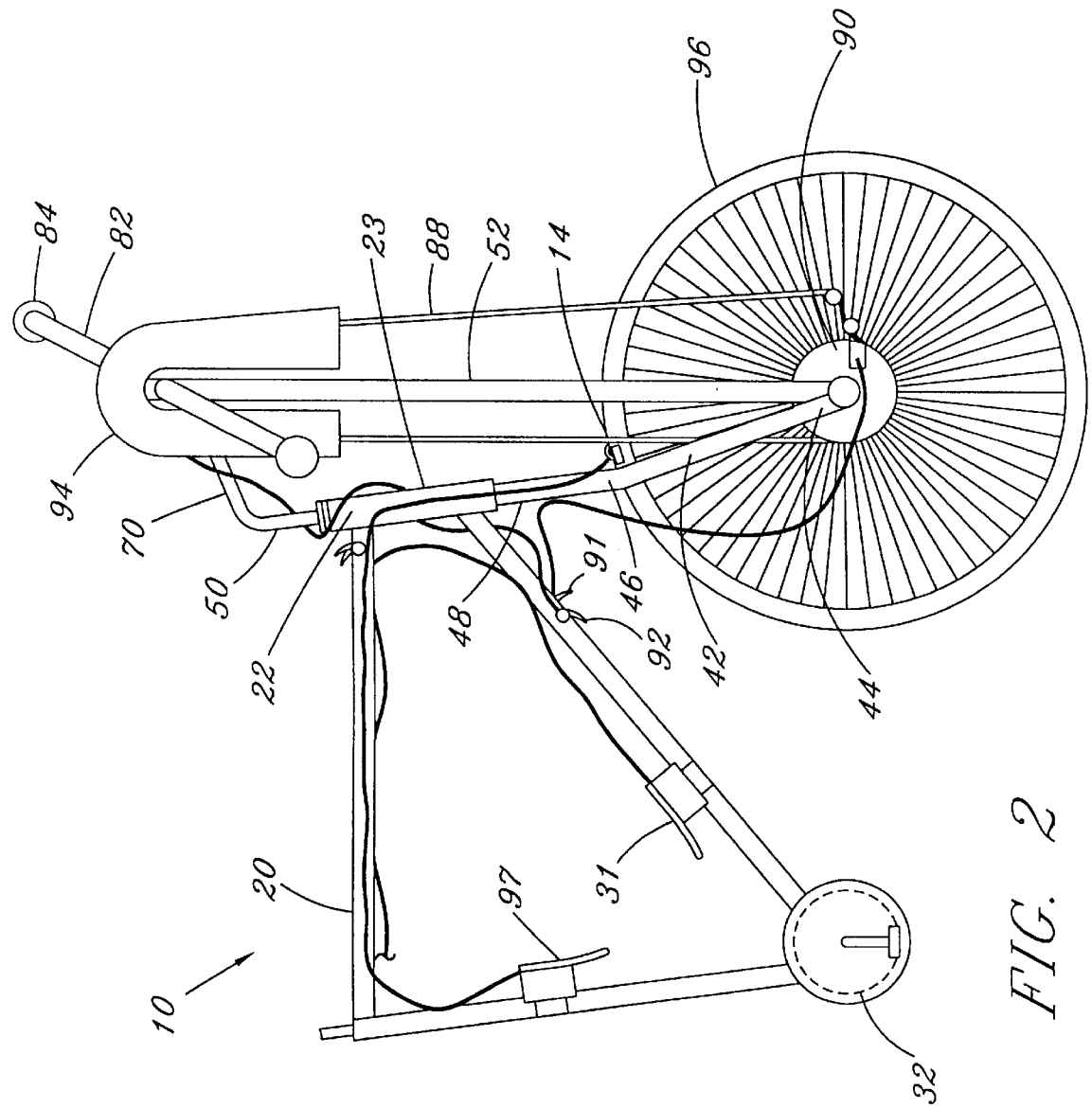
FIG. 2 is an enlarged partial side view of the frame, yoke and front wheel of a first embodiment of the bicycle of claim 1.
Figure 3:
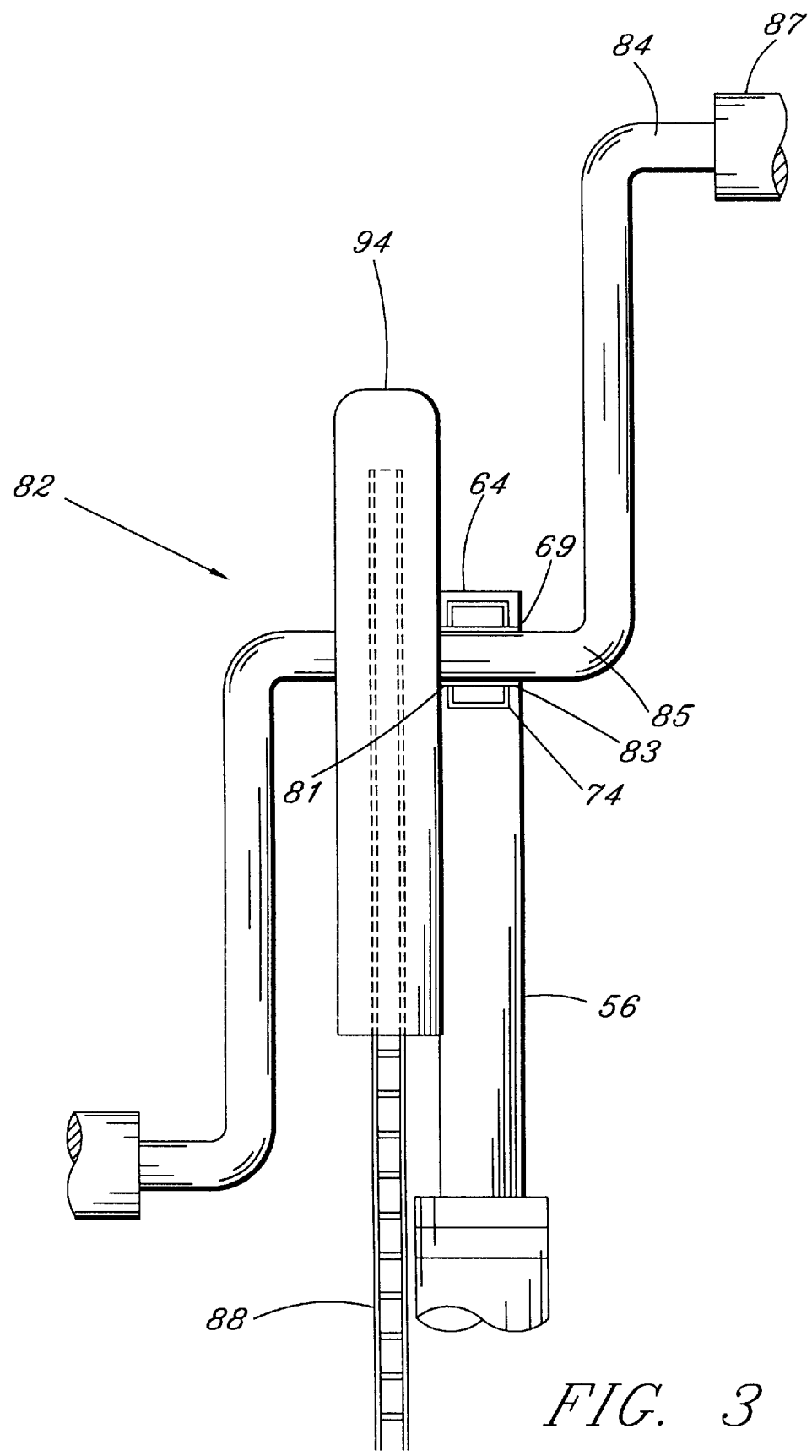
FIG. 3 is an enlarged partial front view, partly in phantom and partly in cross section of the hand crank assembly, housing, and second yoke of the bicycle of claim 1.

The first yoke 40 includes a pair of longitudinally extending members 42 defining a fork (FIG. 2). The front wheel 96 is rotatably mounted within the fork at the lower end 44 of the two fork members 42. The upper ends 46 of the fork members 42 are mounted to a shaft member 48 which extends upwardly through a tubular steering column 23 mounted to the front end portion 22 of the frame 20 wherein the shaft member 48 is pivotally received in the tubular steering column 23. A distal end portion 50 of the shaft member 48 projects upwardly beyond the tubular steering column 23 to a distal end 51 (FIG. 4).

The shaft member 48 comprises a conventional stem, or goose-neck, design that allows the length of the shaft member 48 that projects upwardly beyond the tubular steering column 23 to be adjusted. The head of the adjustment screw is located at the distal end 51.

Figure 4:
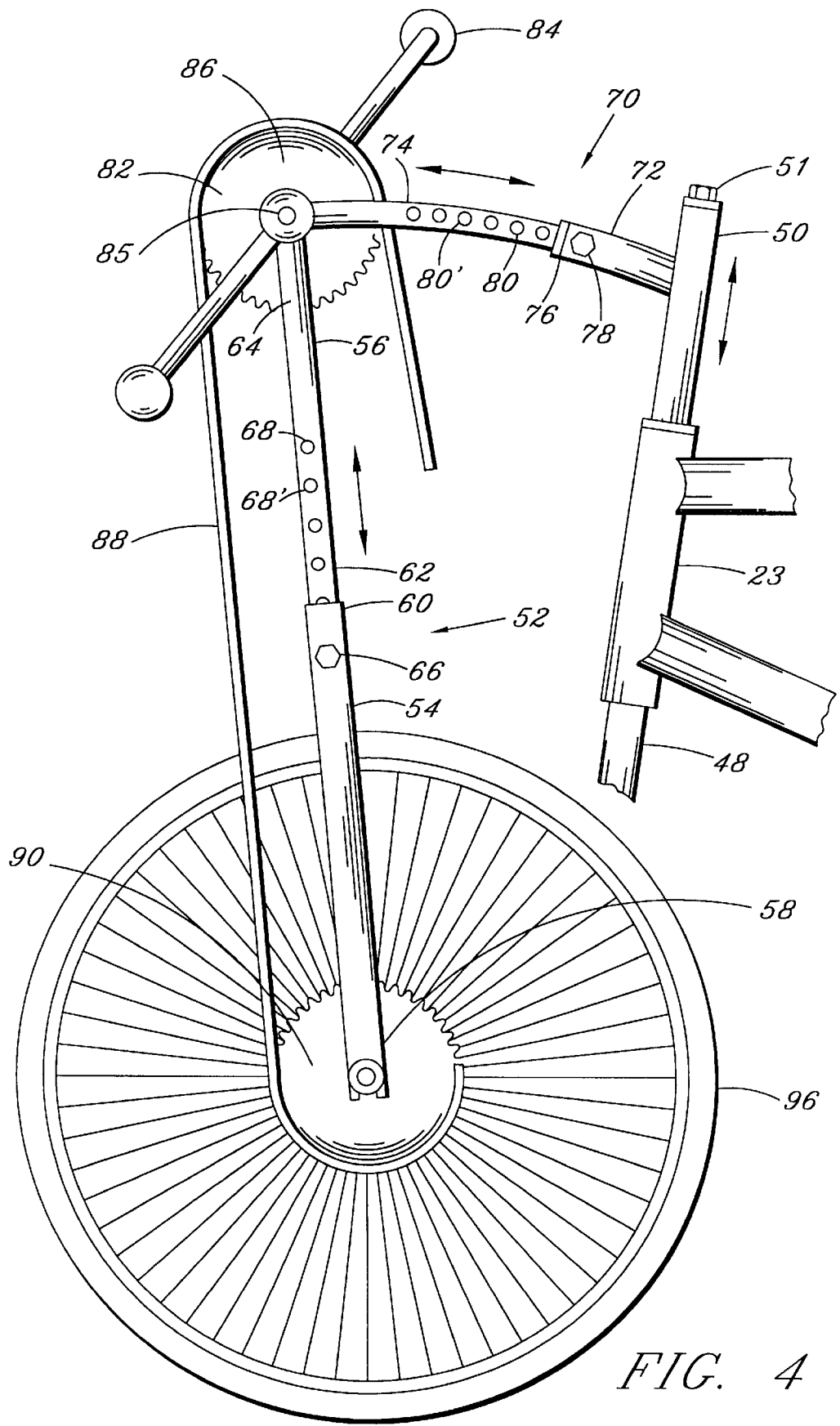
FIG. 4 is an enlarged partial side view of the frame yoke and front wheel of a second embodiment of the bicycle of claim 1.
Figure 5:
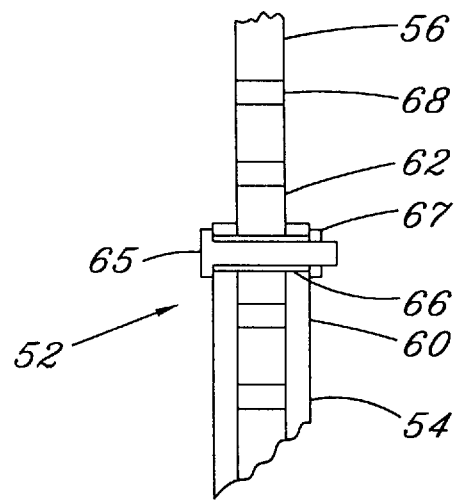
FIG. 5 is an enlarged partial cross section view of the second yoke of FIG. 4.

A second yoke 52 has a lower first segment 54 and an upper second segment 56 (FIG. 4). In a preferred embodiment, the front wheel 96 is mounted to the lower portion 58 of the first segment 54 and the upper portion 60 of the first segment 54 comprises a tubular member defining a bore. The lower portion 62 of the second segment 56 is slidably received in the upper portion 60 of the first segment 54. The upper portion 60 of the first segment 54 has a pair of oppositely disposed apertures 66. The second segment 56 has a plurality of longitudinally spaced apertures 68. The second segment 56 is mounted to the first segment 54 by aligning one of the apertures 68 in the second segment 56 with the pair of apertures 66 in the first segment 54 and inserting a bolt 65 through the aligned apertures 66, 68. A lock-nut 67 is threaded onto the threaded portion of the bolt 65 to secure the second segment 56 to the first segment 54 (FIG. 5).

The length of the second yoke 52 may be adjusted by removing the bolt 65, sliding the lower portion 62 of the second segment 56 into or out of the upper portion 60 of the first segment 54, aligning another of the apertures 68' in the second segment 56 with the pair of apertures 66 in the first segment 54, reinserting the bolt 65, and engaging the lock-nut 67 on the bolt 65. In alternative embodiments, the second segment may comprise a tubular lower portion for receiving the upper portion of the first segment, the lower and upper portions may be threaded whereby the upper and lower portions may be threadably engaged, an outer surface of the first segment may engage an outer surface of the second segment, or the second yoke may comprise a unitary member wherein the length is not adjustable.

Figure 6:
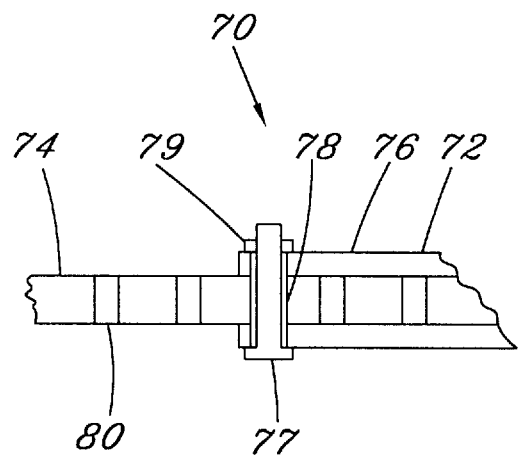
FIG. 6 is an enlarged partial cross section view of the steering coupling member of FIG. 4.

A steering coupling member 70 mounts the second yoke 52 to the first yoke 40. In a preferred embodiment, a first section 72 of the steering coupling member 70 is fixedly attached to the distal end portion 50 of the shaft member 48 and a second section 74 of the steering coupling member 70 is fixedly attached to the upper portion 64 of the second segment 56 of the second yoke 52. At least a portion 76 of the first section 72 of the steering coupling member 70 defines a bore for receiving the second section 74 of the steering coupling member 70. The first section 72 has a pair of oppositely disposed apertures 78. The second section 74 has a plurality of longitudinally spaced apertures 80. The second section 74 is mounted to the first section 72 by aligning one of the apertures 80 in the second section 74 with the pair of apertures 78 in the first section 72 and inserting a bolt 77 through the aligned apertures 78, 80. A lock-nut 79 is threaded onto the threaded portion of the bolt 77 to secure the second section 74 to the first section 72 (FIG. 6).

The length of the steering coupling member 70 may be adjusted by removing the bolt 77, sliding the second section 74 into or out of the first section 72, aligning another of the apertures 80' in the second section 74 with the pair of apertures 78 in the first section 72, reinserting the bolt 77, and engaging the lock-nut 79 on the bolt 77. It should be appreciated that the alternative embodiments disclosed for the second yoke 52 may also be employed for the steering coupling member 70.

In a preferred embodiment, the steering coupling member 70 has an arcuate shape. The shape is defined by a section of a circle formed by rotating the second yoke co-planar to the front wheel 96. The center of this rotation lies upon the axis of rotation of the front wheel 96.

A hand crank assembly 82 is mounted to the steering coupling member 70 and the second yoke 52. The hand crank assembly 82 includes a pair of handles 84 mounted to a second drive sprocket assembly 86 via an axle 85. The second section 74 of the steering coupling member 70 and the second segment 56 of the second yoke 52 each comprise an orifice 81, 69 for receiving a bearing 83. The axle 85 extends through and is free to rotate within the bearing 83.

In a preferred embodiment, a resilient material 87 covers each handle 84 to facilitate gripping the hand crank assembly 82.

Power generated by operation of the hand crank assembly 82 is transmitted by a chain 88 to a third sprocket assembly 90 mounted to the front wheel 96. The second and third sprocket assemblies 86, 90 may be any conventional sprocket assemblies which are shifted by derailleur shift levers 91, 92, respectively. The derailleur shift levers 91, 92 are positioned to allow operation by either hand or foot. A housing 94 is disposed around the second sprocket assembly 86 of the hand crank assembly 82 to prevent the driver from inadvertently contacting the sprocket assembly 86 and the chain 88 which is engaged with the sprocket assembly 86. It should be appreciated that the hand crank assembly 82 acts as a steering wheel. Applying greater torque against one of the handles 84 causes the first yoke 40 to pivot within the tubular steering column 23 of the frame 20.

In a preferred embodiment, the location of the hand crank assembly 82 relative to the seat 12 can be modified by adjusting the length of steering coupling member 70, the length of the second yoke 52, the length of the distal portion 50 of the first yoke shaft which extends above the tubular steering column 23, and the height of the seat 12. This flexibility allows the driver to select a relative position that maximizes his comfort and also maximizes application of power to the foot and hand crank assemblies 32, 82. The arcuate shape of the steering coupling member 70 allows the relative vertical positions of the hand crank assembly 82 and the seat 12 to remain substantially constant as the length of the steering coupling member 70 is adjusted. When the height of the hand crank assembly 82 requires adjustment, the slack in the chain 88 that results will be taken up by the spring action of the conventional derailleur system of the front wheel 96 and the hand crank assembly 82. Alternatively, the cycle may be manufactured in a variety of fixed configurations.

The foot crank drive system may be operated independently of the hand crank drive system. Simultaneous operation of the foot pedal assembly 32 and the hand crank assembly 82 to apply power to both the front and rear wheels 96, 30 allows the driver to accelerate faster and to maintain a higher speed than that which can be attained by conventional cycles. In addition, such operation provides a more thorough cardiovascular work-out. Application of power to the front wheel 96 allows the driver to pull the cycle through turns, providing greater control and safety. Use of a second yoke 52 to offset the hand crank assembly 82 from the axis of the first yoke 40 prevents operation of the hand crank assembly 82 from causing the cycle to become unstable.

It should be appreciated that a two-wheel drive hand and foot powered bicycle in accordance with the invention may be manufactured from standard bicycle parts with little modification. It should be further appreciated that existing bicycles may be easily converted to a two-wheel drive and foot powered bicycle in accordance with the invention. Standard sprocket and derailleur mechanisms are utilized for both the front and rear wheels 96, 30. The steering coupling member 70 is mounted to the top of the first yoke 40 in place of a handle bar. The second yoke 52 is easily manufactured from the materials which are used to manufacture the first yoke 40.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A foot and hand operated cycle apparatus comprising:

frame means having oppositely disposed front and rear end portions;

first yoke means, for steering said cycle, pivotally mounted to said front end portion of said frame means, said first yoke means having a first end portion;

second yoke means disposed forward of said first yoke means, said second yoke means comprising oppositely disposed first and second end portions;

a first wheel rotatably mounted to said first end portion of said first yoke means and said second end portion of said second yoke means;

a second wheel rotatably mounted to said rear end portion of said frame means;

first drive means for selectively rotating said first wheel by hand, comprising a hand pedal assembly supported at said first end portion of said second yoke means; and second drive means for selectively rotating said second wheel by foot.

2. The apparatus of claim 1 wherein said hand pedal assembly is supported at a distance from said first wheel, said second yoke means comprises first and second segments, said first segment defining a pair of bolt mounting apertures and a bore for partially slidably receiving said second segment, said second segment defining a plurality of longitudinally spaced bolt mounting apertures, and said second yoke further comprises a threaded connector bolt adapted to be inserted through the bolt mounting apertures of said first segment and a first of said bolt mounting apertures of said second segment and nut means engageable with said bolt for mounting said second segment to said first segment, wherein said distance may be adjusted by unbolting said bolt, aligning a second of said bolt mounting apertures of said second segment with said bolt mounting apertures of said first segment, inserting said bolt through said apertures and engaging said bolt to said nut means.

3. The apparatus of claim 1 further comprising steering coupling means for coupling said second yoke means to said first yoke means, said first yoke means defining an axis, wherein applying a steering torque to said hand pedal assembly causes said first wheel to pivot around said axis.

4. The apparatus of claim 3 wherein said steering coupling means has an arcuate shape defining an arc section of a circle defined by rotation of said first end portion, of second yoke means about said first wheel.

5. The apparatus of claim 3 wherein said steering coupling means comprises a steering coupling member having a first end portion mounted to said first yoke means and a second end portion mounted to said second yoke means, said first yoke means being mounted at a distance from said second yoke means, said steering coupling means further comprising adjustment means for adjusting said distance.

6. The apparatus of claim 5 wherein said steering coupling means comprises first and second sections, said first section defining a pair of bolt mounting apertures and a bore for partially slidably receiving said second section, said second section defining a plurality of longitudinally spaced bolt mounting apertures, said steering coupling means further comprising a threaded connector bolt adapted to be inserted through the bolt mounting apertures of said first section and a first of said bolt mounting apertures of said second section and nut means engageable with said bolt for mounting said second section to said first section, wherein said distance may be adjusted by unbolting said bolt, aligning a second of said bolt mounting apertures of said second section with said bolt mounting apertures of said first section, inserting said bolt through said apertures and engaging said bolt to said nut means.

7. The apparatus of claim 1 wherein said first wheel comprises a hub and said first drive means is composed of drive sprocket means rotatably mounted to said first end portion of said second yoke means, handle means comprising opposed first and second handles mounted to said drive sprocket means for selectively rotating said drive sprocket means, driven sprocket means mounted to said hub, and transmission means engageable with said drive sprocket means and said driven sprocket means for transmitting rotary motion from said drive sprocket means to said driven sprocket means.

8. The apparatus of claim 7 wherein said transmission means comprises a chain.

9. The apparatus of claim 7 wherein said apparatus further comprises housing means disposed around said drive sprocket means.

10. The apparatus of claim 6 wherein said front end portion of said frame means comprises a tubular column and said first yoke means comprises shaft means pivotally disposed through said tubular column, said shaft means having a distal end, wherein said first section of said steering coupling means is mounted to said shaft means intermediate said distal end of said shaft means and said tubular column.

11. The apparatus of claim 1 further comprising first and second brake means for braking said first and second wheels, respectively, said first and second brake means comprising first and second brake control levers mounted to said frame means.

12. The apparatus of claim 8 further comprising first derailleur means for selectively shifting said chain over said drive sprocket and second derailleur means for selectively shifting said chain over said driven sprocket, said first and second derailleur means each comprising a derailleur control lever mounted to said frame means, wherein said derailleur control levers of said first and second derailleur means are operable by both hand and foot.

13. A foot and hand operated cycle apparatus comprising:
   frame means having oppositely disposed front and rear end portions;
   first yoke means, for steering said cycle, pivotally mounted to said front end portion of said frame means;
   a first wheel rotatably mounted to said first yoke means;
   a second wheel rotatably mounted to said rear end portion of said frame means;
   first drive means comprising drive sprocket means, handle means mounted to said drive sprocket means for selectively rotating said drive sprocket means, driven sprocket means mounted to said first wheel, and transmission means engageable with said drive sprocket means and said driven sprocket means for transmitting rotary motion from said drive sprocket means to said driven sprocket means for selectively rotating said first wheel by hand;
   second yoke means for supporting said first drive means;
   steering coupling means for coupling said second yoke means to said first yoke means;
   second drive means for selectively rotating said second wheel by foot; and
   first derailleur means for selectively shifting said transmission means over said drive sprocket means and second derailleur means for selectively shifting said transmission means over said driven sprocket means, said first and second derailleur means each comprising a derailleur control lever positioned on said frame means for operation by both hand and foot.

14. The apparatus of claim 13 wherein said second yoke means comprises oppositely disposed first and second end portions, said first drive means being supported at said first end portion, said first wheel being rotatably mounted to said second yoke means at said second end portion at a first distance from said first drive mean, wherein said second yoke means comprises adjustment means for adjusting said first distance.

15. The apparatus of claim 14 wherein said steering coupling means comprises a steering coupling member having a first end portion mounted to said first yoke means and a second end portion mounted to said second yoke means, said first yoke means being mounted at a second distance from said second yoke means, said steering coupling means further comprising adjustment means for adjusting said second distance.

16. The apparatus of claim 13 wherein said front end portion of said frame means comprises a tubular column and said first yoke means comprises shaft means pivotally extending through said tubular column, said shaft means having a distal end, wherein said steering coupling means is mounted to said shaft means intermediate said distal end and said tubular column.

17. The apparatus of claim 13 wherein said second yoke means comprises a second end portion and an oppositely disposed first end, said first wheel being rotatably mounted to said second yoke means at said second end portion, and said steering coupling means has an arcuate shape defining an arc section of a circle defined by rotation of said first end of second yoke means about said first wheel.

18. The bicycle of claim 13 further comprising second drive means for selectively rotating said second wheel by foot.

19. A bicycle comprising:
   frame means having oppositely disposed front and rear end portions, said front end portion comprising a tubular column;
   first yoke means, for steering said bicycle, having a length and comprising shaft means pivotally disposed through said tubular column, said shaft means having a distal end;
   a first wheel rotatably mounted to said first yoke means;
   first drive means for selectively rotating said first wheel by hand;
   second yoke means, for supporting said first drive means, having oppositely disposed first and second ends defining a length and comprising first and second segments, said first segment defining a bore for partially slidably receiving said second segment and a pair of bolt mounting apertures, said second segment defining a plurality of longitudinally spaced bolt mounting apertures, said second yoke further comprising a first threaded connector bolt adapted to be inserted through the bolt mounting apertures of said first segment and a first of said bolt mounting apertures of said second segment and nut means engageable with said first bolt for securing said second segment to said first segment;
   steering coupling means, for coupling said second yoke means to said first yoke means, having a length and an arcuate shape defining an arc section of a circle defined by rotation of said first end of second yoke means about said first wheel, said steering coupling means comprising a first section mounted to said second segment of said second yoke means and a second section mounted to said shaft means of said first yoke means intermediate said distal end of said shaft means and said tubular column, said first section defining a bore for partially slidably receiving said second section, and a pair of bolt mounting apertures, said second section defining a plurality of longitudinally spaced bolt mounting apertures, said steering coupling means further comprising a second threaded connector bolt adapted to be inserted through the bolt mounting apertures of said first section and a first of said bolt mounting apertures of said second section and nut means engageable with said second bolt for securing said second section to said first section; and a second wheel rotatably mounted to said rear end portion of said frame means;

wherein said length of said second yoke means may be adjusted by unbolting said first bolt, aligning a second of said bolt mounting apertures of said second segment with said bolt mounting apertures of said first segment, inserting said first bolt through said apertures and engaging said first bolt to said nut means and wherein said length of said steering coupling means may be adjusted by unbolting said second bolt, aligning a second of said bolt mounting apertures of said second section with said bolt mounting apertures of said first section, inserting said second bolt through said apertures and engaging said second bolt to said nut means.

* * * * *